United States Patent
Zhang

(10) Patent No.: US 9,535,655 B2
(45) Date of Patent: Jan. 3, 2017

(54) METHOD FOR CONTROLLING ELECTRONIC DEVICE AND ELECTRONIC DEVICE

(71) Applicant: Lenovo (Beijing) Co., Ltd., Beijing (CN)

(72) Inventor: Lei Zhang, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/500,245

(22) Filed: Sep. 29, 2014

(65) Prior Publication Data
US 2015/0277854 A1    Oct. 1, 2015

(30) Foreign Application Priority Data

Mar. 26, 2014   (CN) .......................... 2014 1 0116677

(51) Int. Cl.
| | |
|---|---|
| *G06F 3/16* | (2006.01) |
| *G06F 1/16* | (2006.01) |
| *G06F 3/03* | (2006.01) |
| *H04N 5/44* | (2011.01) |
| *H04N 5/64* | (2006.01) |

(52) U.S. Cl.
CPC ............. *G06F 3/167* (2013.01); *G06F 1/1652* (2013.01); *G06F 3/03* (2013.01); *H04N 5/4403* (2013.01); *H04N 5/64* (2013.01); *H04N 2005/4408* (2013.01); *H04N 2005/4425* (2013.01)

(58) Field of Classification Search
None
See application file for complete search history.

(56) References Cited

U.S. PATENT DOCUMENTS

| | | | | |
|---|---|---|---|---|
| 2009/0201165 | A1* | 8/2009 | Hwang | F16M 11/08 340/686.1 |
| 2011/0095975 | A1* | 4/2011 | Hwang | G06F 1/1626 345/156 |
| 2012/0075166 | A1* | 3/2012 | Marti | G06F 3/011 345/1.1 |
| 2012/0313862 | A1* | 12/2012 | Ko | G09G 3/3433 345/173 |
| 2013/0076605 | A1* | 3/2013 | Cope | G02F 1/133305 345/87 |
| 2013/0100392 | A1* | 4/2013 | Fukushima | G09F 9/30 349/150 |

(Continued)

*Primary Examiner* — Claire X Pappas
*Assistant Examiner* — Benjamin Casarez
(74) *Attorney, Agent, or Firm* — Brinks Gilson & Lione; G. Peter Nichols

(57) ABSTRACT

A controlling method and an electronic device are described. The method is applied to an electronic device that includes determining whether the electronic device satisfies a preset condition in case of a deformable structure in the electronic device being in a first form; and obtaining a first control instruction, controlling the deformable structure to deform from the first form to a second form to drive at least a part of a body of the electronic device to be deformed in case of the electronic device satisfying the preset condition, and controlling the deformable structure to maintain in the second form before a second control instruction is received, wherein, the second control instruction controls the deformable structure to deform from the second form to a third form which is different from or the same as the first form.

19 Claims, 9 Drawing Sheets

(56) References Cited

U.S. PATENT DOCUMENTS

| | | | | |
|---|---|---|---|---|
| 2013/0114193 A1* | 5/2013 | Joo | ................. | F16M 11/08 |
| | | | | 361/679.01 |
| 2013/0207946 A1* | 8/2013 | Kim | ................. | G09G 3/3225 |
| | | | | 345/204 |
| 2013/0329422 A1* | 12/2013 | Park | ................. | G02F 1/133305 |
| | | | | 362/233 |
| 2014/0004906 A1* | 1/2014 | Chi | ................. | H04B 1/38 |
| | | | | 455/566 |
| 2014/0111549 A1* | 4/2014 | Vanska | ................. | G06F 1/1626 |
| | | | | 345/656 |
| 2014/0118910 A1* | 5/2014 | Sung | ................. | G09F 9/301 |
| | | | | 361/679.01 |
| 2014/0268584 A1* | 9/2014 | Song | ................. | H05K 7/02 |
| | | | | 361/728 |
| 2014/0301026 A1* | 10/2014 | Liu | ................. | G06F 1/1613 |
| | | | | 361/679.01 |
| 2014/0314999 A1* | 10/2014 | Song | ................. | G06F 1/1601 |
| | | | | 428/174 |
| 2014/0354791 A1* | 12/2014 | Lee | ................. | G06K 9/00228 |
| | | | | 348/77 |
| 2015/0049090 A1* | 2/2015 | Kim | ................. | G06F 3/0487 |
| | | | | 345/442 |
| 2015/0123914 A1* | 5/2015 | Choi | ................. | G06F 1/1652 |
| | | | | 345/173 |
| 2015/0317949 A1* | 11/2015 | Cho | ................. | G09G 5/14 |
| | | | | 345/31 |
| 2016/0035310 A1* | 2/2016 | Song | ................. | G06F 3/017 |
| | | | | 345/156 |
| 2016/0048031 A1* | 2/2016 | Gu | ................. | G02B 27/2271 |
| | | | | 345/156 |
| 2016/0205391 A1* | 7/2016 | Kim | ................. | H04N 13/0468 |
| | | | | 348/51 |

* cited by examiner

METHOD FOR CONTROLLING ELECTRONIC DEVICE AND ELECTRONIC DEVICE

This application claims priority to Chinese patent application No. 201410116677.1, filed on Mar. 26, 2014 the entire contents of which are incorporated herein by reference.

BACKGROUND

The present disclosure relates to the technical field of electronics, and especially relates to a method for controlling an electronic device and an electronic device.

With the development of technology, more and more electronic devices, such as smart phones, tablet computers, laptops, smart TVs, etc, come into people's lives, and these electronic devices bring a great convenience to people's life.

At present, the electronic device, such as tablet computers and smart phones, at least has a housing which is almost made of rigid materials, and can hardly make any deformation. Even though the electronic device uses a flexible screen, the flexible screen is deformed only when external force is applied to the flexible screen.

SUMMARY

The present disclosure provides a method for controlling an electronic device and an electronic device to achieve that self-deformation of electronic device, and improve the intelligence of the electronic device, and provide a good user experience. In the first aspect, there is provided an method for controlling an electronic device, comprising: determining whether the electronic device satisfies a preset condition in case of a deformable structure in the electronic device being in a first form; and obtaining a first control instruction, controlling the deformable structure to deform from the first form to a second form to drive at least a part of a body of the electronic device to be deformed in case of the electronic device satisfying the preset condition, and controlling the deformable structure to maintain in the second form before a second control instruction is received, wherein, the second control instruction controls the deformable structure to deform from the second form to a third form which is different from or the same as the first form.

In the second aspect, there is provided an electronic device, comprising: a body; a controller, provided in the body; a deformable structure, provided on the body and connected with the controller; wherein, in case that the deformable structure is in the first form, the controller determines whether the electronic device satisfies a preset condition; in case that the electronic device satisfies the preset condition, obtains a first control instruction, controls the deformable structure to deform from the first form to a second form to drive at least a part of the body to be deformed, and before a second control instruction is received, controls the deformable structure to maintain in the second form, wherein, the second control instruction is used for controlling the deformable structure to deform from the second form to a third form which is the same as or different from the first form.

Advantageous Effects of the Present Disclosure

Because a controller is provided in the body of the electronic device and a deformable structure, which is connected with the controller, is provided on the body, in case that the deformable structure is in the first form, it is determined whether the electronic device satisfies a preset condition. in case that the electronic device satisfies the preset condition, the first control instruction is obtained, the deformable structure is controlled to deform from the first form to the second form, and at least a part of the body is driven to be deformed, and before the second control instruction is received, the deformable structure is controlled to maintain in the second form, that is to say, in case that the deformable structure is in the first form, the controller can control the deformable structure to deform to the second form in the case that the electronic device satisfies the preset condition, and can maintain in the second form before a further control instruction is received. The deformation of the deformable structure can drive at least a part of body to be deformed, that is, the electronic device can deform on its own without any external force, and it effectively solves the conventionally technical problem that the electronic device cannot deform on its own, and achieves that the electronic device deforms on its own, and improves the intelligence of the electronic device, and provides a good user experience.

DETAILED DESCRIPTION

In order to solve the conventionally technical problem that the electronic device cannot deform on its own, the embodiments of the present disclosure provide a method for controlling an electronic device and an electronic device.

Hereinafter, the technical solutions of the embodiment of the present disclosure will be described clearly and completely with reference to the accompanying drawings in the embodiment of the present disclosure in order to make the objects, the technical solutions and the advantages of the embodiment of the present disclosure clearer. It is obvious that the described embodiments are only a part of embodiments of the present disclosure, but not all embodiments. Based on the embodiments of the present disclosure, all the other embodiments which are obtained, under the premise that there is no creative effort, by those skilled in the art will fall in the protection scope of the present disclosure.

In addition, the term "and/or" used herein only refers to an association relationship for describing associated objects, indicating that there may be three kinds of relationship. For example, A and/or B may indicate the following three cases: only A, both A and B, and only B. Moreover, the character "/" used herein generally indicates a "or" relationship between associated objects before and after "/".

The preferred embodiments of the present disclosure will be described below in detail in conjunction with the accompanying Figures.

Figure 1:
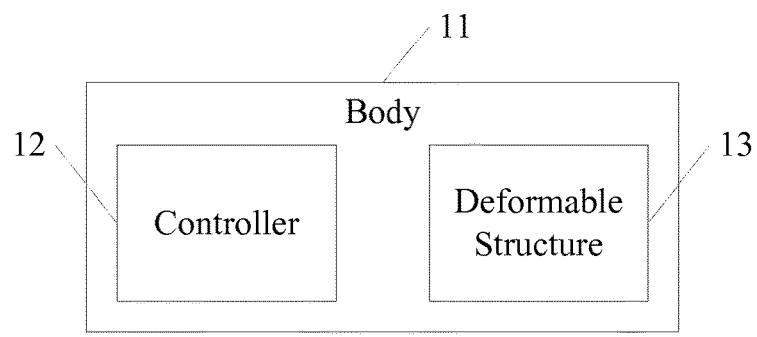
FIG. 1 is a functional block diagram of the electronic device in an embodiment.

An embodiment of the present disclosure provides a method for controlling an electronic device, which is applied to an electronic device. As illustrated in FIG. 1 which is a functional block diagram of the electronic device, the electronic device comprises a body 11, a controller 12 and a deformable structure 13, wherein the controller 12 is provided in the body 11, and the deformable structure 13 is provided on the body 11, and the controller 12 is connected with the deformable structure 13, and the controller 12 is able to control the deformation of the deformable structure 13.

Figure 2:
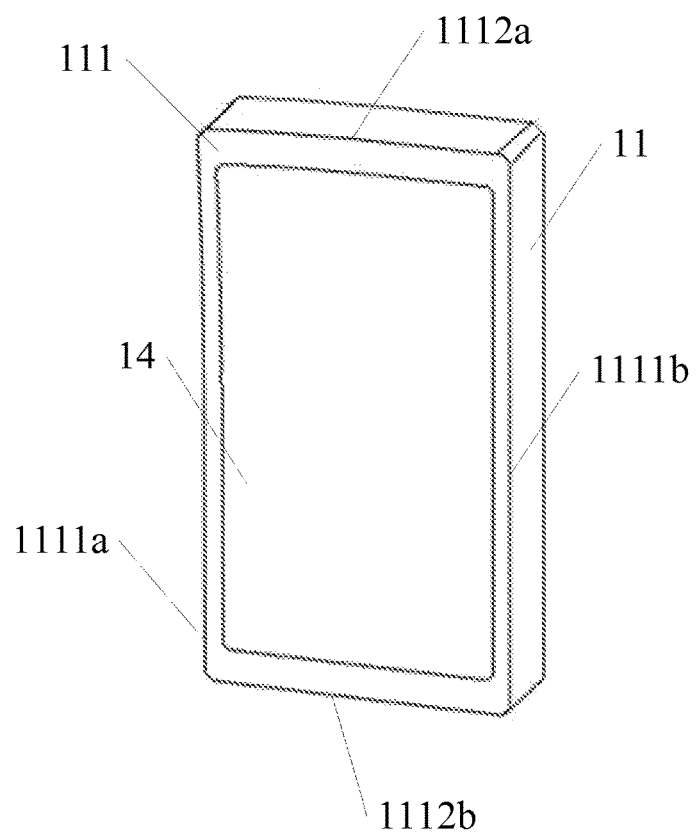
FIG. 2 is a structural schematic of the body in an embodiment.

Alternatively, as illustrated in FIG. 2 which is a structural schematic of the body, the electronic device may also comprise a deformable display unit 14 which is provided on a first surface 111 of the body 11, and the display unit 14 may be a flexible display screen.

Alternatively, the first surface 111 has two long sides and two short sides, and the two long sides are connected with the two short sides from end to end to form a rectangle, wherein, the two long sides face each other and the two short sides face each other.

In the embodiment, the deformable structure 13 may be, but not limited to, the following two structures.

Figure 3A:
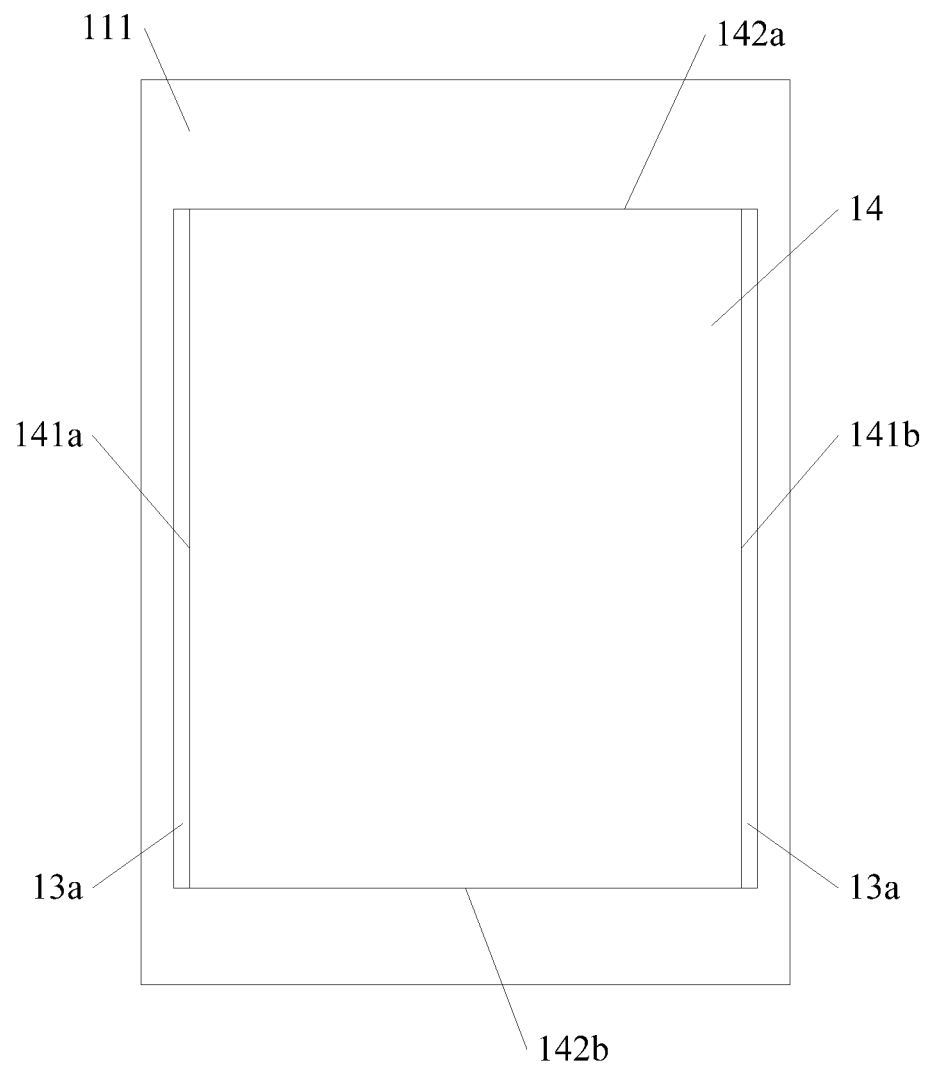
FIGS. 3A-3B are schematics of relatively positional relationship of a deformable structure and the body 11 in an embodiment.

In the first structure, the deformable structure 13 is a movable connector 13a for connecting at least two sides of the display unit 14 with the first surface 111. As illustrated in FIG. 3A, the display unit 14 has two long sides, a side 141a and a side 141b, and two short sides, a side 142a and a side 142b, and the connector 13a can be disposed on a first side of the display unit 14, such as the side 141a, and a second side, i.e. the opposite side 141b thereof. Of course, the connector 13a may also disposed on other sides of the display unit 14, such as the two short sides or all long sides and short sides of the display unit 14, or it may be disposed on each of the corners of the display unit 14, and the present disclosure does not intend to make any limitation.

In practice, the connector 13a can be a combination of a plurality of sliding rails and sliding plates, with the sliding rails being fixed on the body 11, the sliding plates being embedded in the sliding rails and one end of respective sliding plates being connected with the display unit 14.Thus, in case that the display unit 14 is deformed, the display unit 14 can drive the sliding plates to slide in the sliding rails so as to increase or decrease the distance between the body 11 and the display unit 14. Of course, the connector 13a may also be an elastic connector, such as lightweight spring, rubber sheet, and cloth sheet. One end of respective connectors 13a is fixed on the body 11 and the other end is fixed on the display unit 14, and in case that the display unit 14 is deformed, it can drive these connectors to stretch so as to increase or decrease the distance between the body 11 and the display unit 1.

It should be noted that the connector 13a and display unit 14 can be integrally molded, and can also be glued together or welded together. The present disclosure does not intend to make any limitation.

Figure 3B:
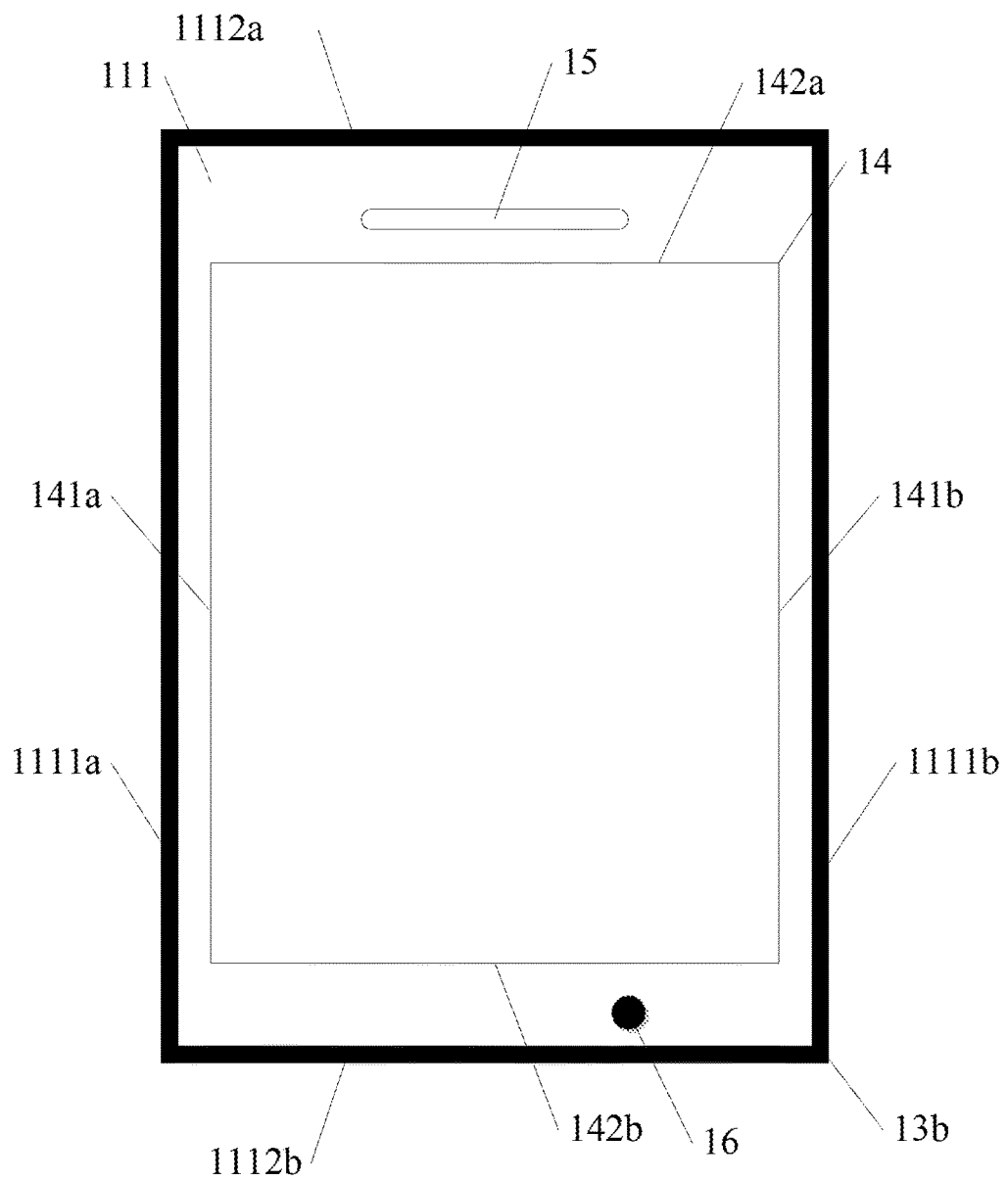

In the second structure, as illustrated in FIG. 3B, the deformable structure 13 is a frame 13b provided at the edges of the body 11. For example, the frame 13b is a rectangle frame with two long sides, i.e. the sides 1111a and 1111b, and two short sides, i.e. the sides 1112a and 1112b. Of course, the frame 13b can also be a polygon or an irregular pattern, and the present disclosure does not intend to make any limitation. In the present embodiment, the frame 13b is a rectangle frame.

Further, the frame 13b can be formed of a shape memory material, such as shape memory metal or alloy, and in case that different voltages are applied to the two ends of any side of the frame 13b, different degree of deformation will occur to the side. Further, the frame 13b can also include at least one hinge, each section of which can be controlled by the controller 12 and can move with respect to the body 11 so as to deform the entire frame 13b. In practice, the frame 13b can also have other particular structures, and those skilled in the art can design it on their own as long as the frame can be deformed, and the present disclosure does not intend to make any limitation.

Of course, the deformable structure 13 is not limited to the above described two structures, and the present disclosure does not intend to make any limitation.

Figure 4:
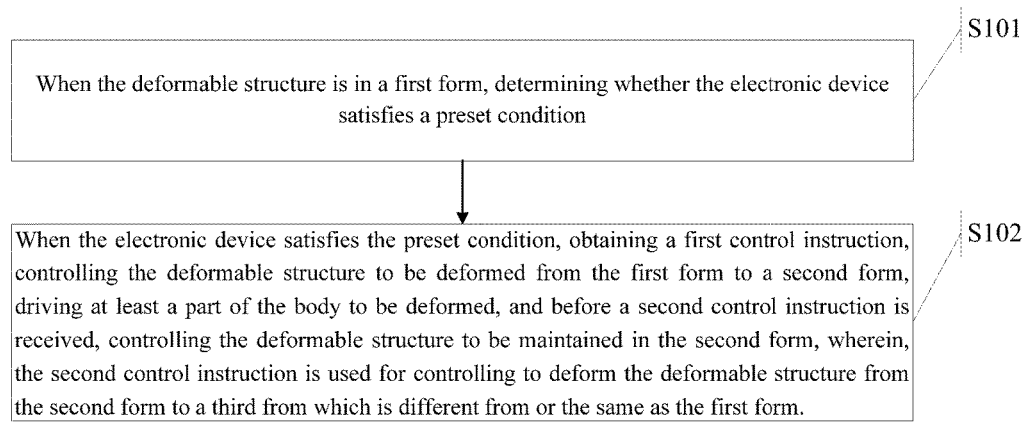
FIG. 4 is a flowchart of a method for controlling an electronic device in an embodiment.

With reference to FIG. 4, the method for controlling the electronic device comprises:

S101: determining whether the electronic device satisfies a preset condition in case of the deformable structure being in a first form;

S102: obtaining a first control instruction, controlling the deformable structure to deform from the first form to a second form to drive at least a part of the body to be deformed in case of the electronic device satisfying the preset condition, and before a second control instruction is received, controlling the deformable structure to maintain in the second form, wherein, the second control instruction is used for controlling to deform the deformable structure from the second form to a third from which is different from or the same as the first form.

Hereinafter, the above method will be described in combination with the structure of the electronic device.

Figure 5A:
FIGS. 5A-5B are form schematics of a deformable structure in an embodiment.
Figure 5B:
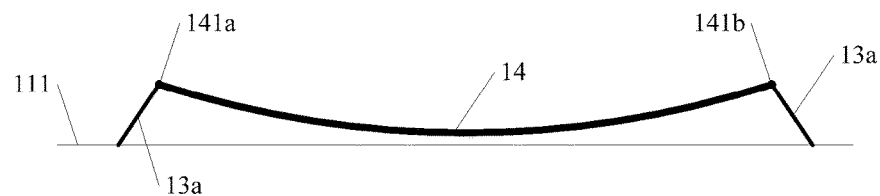

First, with respect to the first structure of the above deformable structure 13, in combination with FIG. 3A, the deformable structure 13, i.e. the connector 13a, has the first form and the second form. For example, as illustrated in FIG. 5A, the first form is that the display unit 14 is deployed as a flat surface which is coplanar with the first surface 111, and it looks, from the user, that the display unit 14 is provided on the first surface 111; as illustrated in FIG. 5B, the second form is: in case that the connector 13a is in the second form, at least two sides of the display unit 14, such as the first side and the second side, i.e. the side 141a and the side 141b, are at a first location with respect to the first surface 111, and at this time, the two sides of the display unit 14 are higher than the other parts so that the display unit 14 forms a curve surface screen.

Particularly, in case that the connector 13a is in the above first form, S101 is performed, and the controller 12 determines whether the electronic device satisfies a preset condition, such as determining whether the electronic device activates a first type of application, determining whether the electronic device has received the user's operation to the deformation activating button or determining the way of holding the electronic device. In the present embodiment, the case in which the controller 12 determines whether the electronic device activates a first type of application is taken as an example. Particularly, the said first type of application can be a telephone application, an instant voice application, a voice recording application, a video player or an audio player, etc.

In case that the electronic device activates the first type of application, that is, in case that the electronic device satisfies the above preset condition, S102 is performed, i.e., obtaining the first control instruction, controlling the deformable structure 13 to deform from the first form to the second form to drive at least a part of the body 1 to be deformed in case of the electronic device satisfying the preset condition, and controlling the deformable structure 13 to maintain in the second form before the second control instruction is received, wherein, the second control instruction controls to deform the deformable structure 13 from the second form to the third from which is different from or the same as the first form. That is, the controller 12 obtains the first control instruction, controls the deformable structure 13 to deform to the second form and maintains the second from until the second control instruction is obtained, and then deforms the deformable structure 13 from the second from to the third form. The said third form herein can be the same as the first form, and in that case, the second control instruction is a restoring instruction; or it can be different from the first form, and in that case, the second control instruction is a deforming instruction.

In a particular implementation process, after it is determined that the electronic device activates the first type of application through S101, S102 can be: in case that the controller 12 determines that the electronic device activates the first type of application, generating the first control instruction, determining a preset shape corresponding to the preset condition, that is, determining a preset shape corresponding to the first type of application, then controlling the deformable structure 13, i.e. the connector 13a, to move with respect to the body 11 so as to drive the side 141a and the side 141b to be moved with respect to the body 11, and deforming to the second form so that the display unit 14 is deformed to the above preset shape.

For example, in case that the first type of application is the telephone application, specifically, S102 is: in case that the controller 12 determines that the electronic device activates the telephone application, for example, the electronic device receives an incoming call, or the user opens a dial interface, or the user presses a dial key, at this time, the controller 12 controls the connector 13a to move away from the first surface 111 with respect to the body 11 by filling gas or liquid to the position, which is close to the side 141a and the side 141b, inside the display unit 14, or by controlling the extension of the connector 13a which connects to the side 141a and the side 141b, so that the side 141a and the side 141b are driven to move with respect to the body 11 and the deformed to the above second form, and therefore, as illustrated in FIG. 5B, the display unit 14 is deformed to be the preset shape corresponding to the telephone application, and thus, in case that the user is making a phone call, the display unit 14 is a curve surface and fit to the user's face. At this time, the displacement of the side 141a with respect to the first surface 111 can be larger than or equal to that of the side 141b with respect to the first surface 111, and the present disclosure does not intend to make any limitation.

For another example, in case that the first type of application is the video player application, particularly, S102 is: in case that the controller 12 determines that the electronic device activates the video player application, the controller 12 controls the connector 13a to move away from the first surface 111 with respect to the body 11 by filling gas or liquid to the position, which is close to the side 141a and the side 141b, inside the display unit 14, or by controlling the extension of the connector 13a which connects to the side 141a and the side 141b, so that the side 141a and the side 141b are driven to move with respect to the body 11 and the deformed to second form, and therefore, as illustrated in FIG. 5B, the display unit 14 is deformed to be the preset shape corresponding to the video player application, and thus, in case that the user is watching the video, the distances between the view point where the user is located and respective points on the display unit 14 are the same so that the degree of video distortion is reduced.

In practical, in addition to the above two cases, depending on differences of the first type of applications, the corresponding preset shapes are different, and correspondingly, the second forms of the connector 13a are also different, which can be designed by those skilled in the art on their own according to practical demand, and the present disclosure does not intend to make any limitation.

Figure 6A:
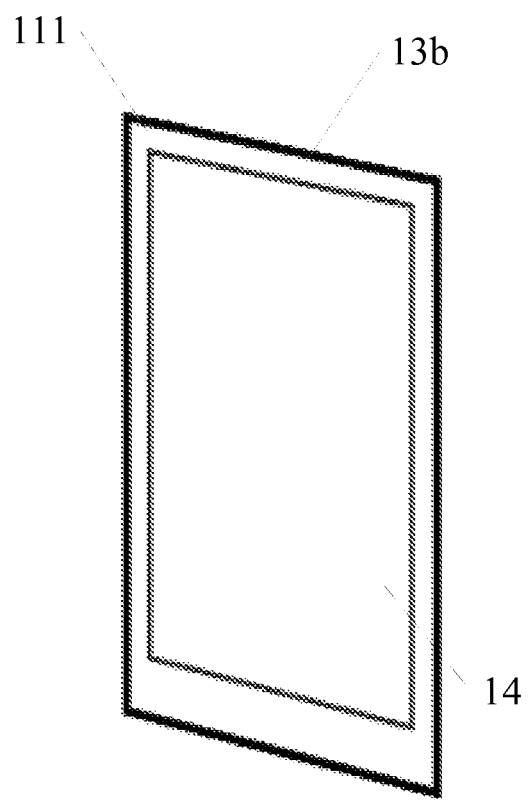
FIGS. 6A-6C are form schematics of a deformable structure in an embodiment.

With reference to FIG. 3B, with respect to the second structure of the above deformable structure 13, the deformable structure 13, i.e. the frame 13b, also has two forms. As illustrated in FIG. 6A, in case that the frame 13b is in the first form, the long sides and the short sides of the frame 13b can determine a surface and the surface is coplanar with the first surface 111; in case that the frame 13b is in the second form, as illustrated in FIG. 6B, the long sides of the frame 13b are bent to be a curve, and as illustrated in FIG. 6C, the short sides of the frame 13b are bent to be a curve.

First, S101 is performed, which is the same as the process of performing the above S101, and the description thereof will be omitted.

Next, after it is determined that the electronic device satisfies the preset condition through S101, for example, the electronic device activates the first type of application, the controller 12 obtains the first control instruction and performs the instruction to determine the preset shape corresponding to the preset condition; the controller 12 controls the frame 13b to deform to the second form so as to drive the body 11 to be deformed to the preset form.

Figure 6B:
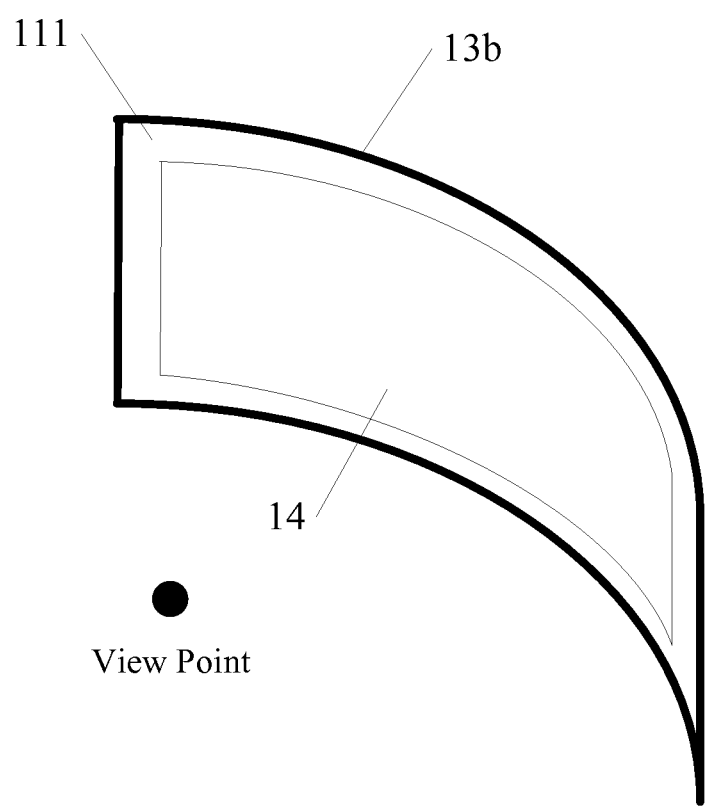
Figure 6C:
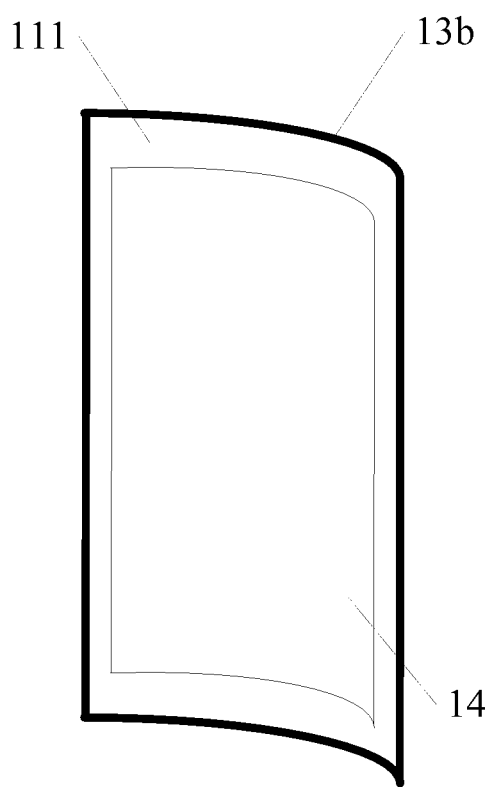

In the present embodiment, with reference to FIG. 3B, the first surface 111 has a third side and a forth side facing with each other, such as the side 1112a and the side 1112b, and a voice output unit 15 is provided on the position, which is close to the side 1112a, on the first surface 111, and in that case, in case that it is determined, through S101, that the electronic device activates the first type of application, such as the audio application, the frame 13b is controlled to deform to the second form, and as illustrated in FIG. 6B, the side 1111a and the side 1111b are controlled to bend, and the distance between the short side 1112a and the short side 1112b is reduced into a preset scope, and the body 11 is driven to be deformed to a preset curve surface so that the display unit 14 is recessed by looking from the view point of the display unit 14, that is, in case that the frame 13b is in the second form, the display unit 14 is recessed toward the direction which is against its facing direction. Thus, in case that the user is making a phone call, the voice output unit 15 can be disposed closer to the user's face so that the user can hear the voice more clearly; further, a voice capture unit 16 can also be provided on a position close to 1112b, and in that case, after the body 11 is deformed to the above preset curve surface, the voice capture unit 16 can also be disposed closer to the user's face so that the voice collected by the electronic device is clearer and the user' experience is improved.

It should be noted that the above audio application, such as a telephone application, an instant voice application, a voice recording application, can output audio files, and the present disclosure does not intend to make any limitation. The above preset scope is determined from an average value of the user's facial curve, which can be 10~13 cm, 13~15 cm, 15~20 cm, and the present disclosure does not intend to make any limitation.

In the present embodiment, due to different curves of the users' faces, in order to fit to the users' faces, after the frame 13b is controlled to deform to the second form, the method further comprises: detecting the distance between a block surface and the third side and/or the forth side, i.e. the side 1112a and the side 1112b, wherein, the block surface is at a side to which the display unit 14 faces, and controls the deformation of the frame 13b so that the distance is less than or equal to the distance threshold to drive the body 11 to be deformed to be the first curve surface in case that the distance is larger than a distance threshold, wherein, the curvature of the first curve surface is larger than that of the preset curve surface.

Figure 7:
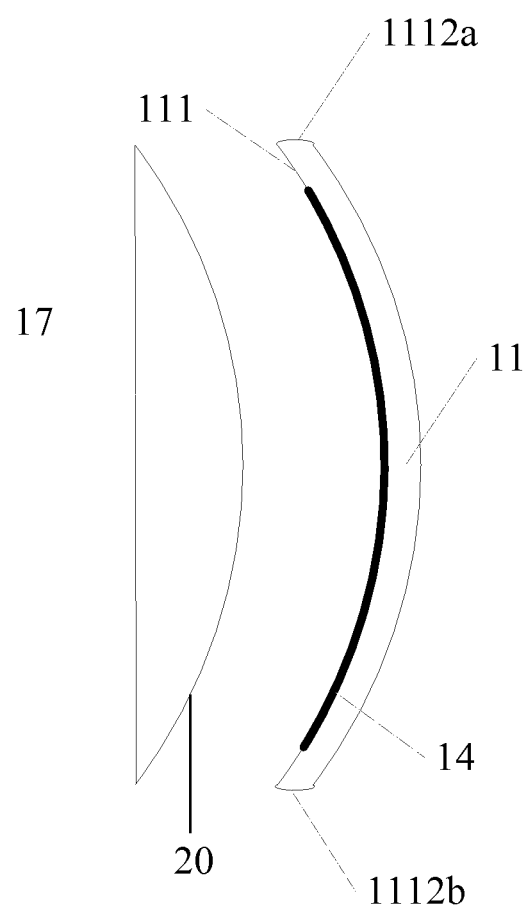
FIG. 7 is a schematic of relatively positional relationship of a block surface and an electronic device in an embodiment.

Specifically, as illustrated in FIG. 7, the above block object 17 faces the first surface 111 and in that case, distance sensors, light sensors or cameras are respectively provided at the positions, which are close to the side 1112a and the side 1112b, on the first surface 111, and the distance between the electronic device and the block surface 20, such as the user's face, wall surface, desk surface, is detected by these sensors. In case that the distance is larger than the distance threshold, it is consider that the electronic device is relatively further away from the block object 17, and therefore, the frame 13b is controlled to deform, that is, the side 1111a and the side 1111b are controlled to bend and the distance between the short side 1112a and the short side 1112b is reduced so that the distance is less than or equal to the distance threshold, and the body 11 is driven to be deformed to the first curve surface. At this time, the distance threshold is a value within the above preset scope, and in case that the distance between the side 1112a and the side 1112b is less than the distance threshold, the curvature of the first curve surface is larger than that of the preset curve surface. Thus, in case that the user disposes the electronic device adjacent to the face, the distance between the block surface, i.e. the user's face, and the electronic device is further reduced so that the electronic device can be disposed to fit to the user's face.

It should be noted that the above preset curve surface and the first curve surface can be a curve surface with a uniform curvature, such as a circular arc, or can be a curve surface with a non-uniform curvature, such as a curve surface with an "L" shape, a "J" curve surface, and the present disclosure does not intend to make any limitation.

In the present embodiment, in case that it is determined that the electronic device activates the first type of application, such as a video player application, through S101, the two long sides, i.e. the side 1111a and the side 1111b, are controlled to deform, and the body 11 is driven to be deformed to the second curve surface with a preset curvature so as to conform with the user's viewing field angle.

Figure 8:
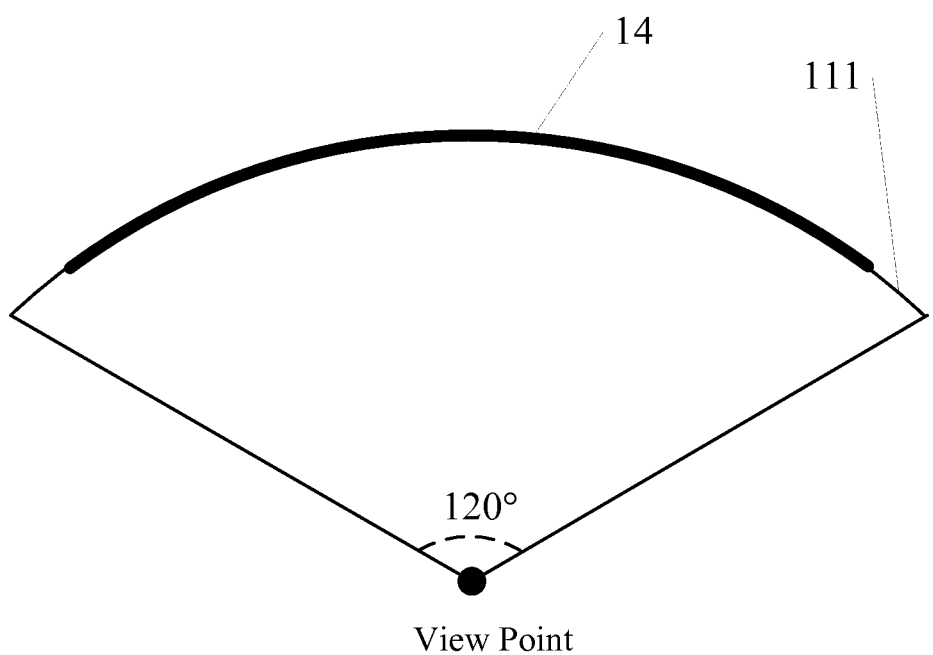
FIG. 8 is a schematic of the user's viewing field angle in an embodiment.

Specifically, as illustrated in FIG. 8, after it is determined that the electronic device activates the video player application through S101, the controller 12 can determine the user's viewing field angle according to the user's settings or by the sensor such as the camera, the distance sensor, and then, a relevant parameter of a deformation to the side 1111a and the side 1111b, such as bending radian, is determined according to the viewing field angle, and at last, according to the above the relevant parameter, the side 1111a and the side 1111b are bent to a curve with the second curvature, and the body 11 is driven to be deformed to the second curve surface.Thus, the user can be provided with better watching experience.

In practice, generally, the user's viewing field angle is 120° -130°.

In the present embodiment, in case that it is determined that the electronic device activates the first type of application, such as a music player application, through S101, S102 can be: after the first control instruction is obtained, generates an instruction sequence based on the first control instruction; performs the instruction sequence, and controls the frame 13b to deform between the second form and a forth form back and forth, wherein, the forth form is the same as or different from the first form.

Particularly, the frame 13b also has the forth form which can be the same as the first form, and at this time, the frame 13b is controlled by the controller 12 and is in the above first form; the forth form can also be different from the first form, and at this time, the frame 13b can only be affected by gravity, and the present disclosure does not intend to make any limitation.

In that case, after obtaining the first control instruction, the controller 12 performs the instruction and generates an instruction sequence comprising a first sub-instruction and a second sub-instruction, wherein the first sub-instruction is for controlling the frame 13b to deform to the second form, and the second sub-instruction is for controlling the frame 13b to deform to the forth form. The controller 12 successively performs respective sub-instructions in the instruction sequence to control the frame 13 to deform between the second form and the forth form back and forth. In one embodiment, time intervals between respective sub-instructions can be determined in accordance with rhythm of the music played by the music player.

In another embodiment, it is determined that the electronic device satisfies a preset condition, such as the manner of holding the electronic device is a first holding manner, through S101, and in case that the electronic device satisfies the preset condition, that is, the manner of holding the electronic device is the first holding manner, a preset shape corresponding to the information of the first holding manner is determined, and the frame 13b is controlled to deform and the body 11 is driven to be deformed to the preset shape so that the distance between two opposite sides which are held by the user is reduced. For example, the first holding manner is holding the side 1111a and the side 1111b, and in that case, in case that the holding manner is the first holding manner, the preset shape corresponding to the first holding manner is determined and the side 1111a and the side 1111b are controlled to bend, and as illustrated in 6C, the body 11 is driven to be deformed to the preset shape so as to reduce the distance between the two opposite sides, i.e. the side 1111a and the side 1111b, which are held by the user.

Based on the same inventive concept, another embodiment of the present disclosure provides an electronic device which can be a tablet device, such as a tablet computer, smart phone. As illustrated in FIG. 1, the electronic device comprises: a body 11; a controller 12 provided in the body 11; a deformable structure 13 provided on the body 11 and connected with the controller 12; wherein, in case that the deformable structure 13 is in the first form, the controller 12 determines whether the electronic device satisfies a preset condition; in case that the electronic device satisfies the preset condition, a first control instruction is obtained, and the deformable structure 13 is controlled to deform from the first form to a second form, and at least a part of the body 11 is driven to be deformed, and before a second control instruction is received, the deformable structure 13 is controlled to maintain in the second form, wherein, the second control instruction is used for controlling the deformable structure 13 to deform from the second form to a third form which is the same as or different from the first form.

Alternatively, as illustrated in FIG. 3A, a deformable display unit 14 is provided on a first surface 111 of the body 11, and at least two sides of the display unit 14 are movably connected with the first surface 111 through the deformable structure 13, and at this time, the deformable structure 13 is a connector 13a which connects the first surface 111 and the display unit 14. Wherein, the at least two sides comprise a first side and a second side, such as a side 141a and a side 141b, which are facing with each other; a controller 12 is particularly used for: determining a preset shape corresponding to a preset condition; controlling the deformable structure 13 to move with respect to the body 11 to drive the first side and the second side, i.e. the side 141a and the side 141b, to be moved with respect to the body 11, and deforming the deformable structure 13 to the second form so as to deform the display unit 14 to the preset shape.

In the embodiment, the deformable structure 13, i.e. the connector 13a, has the first form and the second form. For example, as illustrated in FIG. 5A, the first form is that the display unit 14 is deployed as a flat surface which is coplanar with the first surface 111, and it looks, from the user, that the display unit 14 is provided on the first surface 111; as illustrated in FIG. 5B, the second form is that at least two sides of the display unit 14, such as the first side and the second side, i.e. the side 141a and the side 141b, are at a first location with respect to the first surface 111 in case that the connector 13a is in the second form, and at this time, the two sides of the display unit 14 are higher than the other parts so that the display unit 14 forms a curve surface screen.

Alternatively, as illustrated in FIG. 3B, the deformable structure 13 can also be a frame 13b of the electronic device, which is provided at an edge of the body 11; a controller 12 is particularly used for: determining the preset shape corresponding to the preset condition; controlling the frame 13b to deform to the second form to drive the body 11 to be deformed to the preset shape.

In the present embodiment, the deformable structure 13, i.e. the frame 13b, also has two forms. As illustrated in FIG. 6A, in case that the frame 13b is in the first form, the long sides and the short sides of the frame 13b can determine a surface and the surface is coplanar with the first surface III; in case that the frame 13b is in the second form, as illustrated in FIG. 6B, the long sides of the frame 13b are bent to be a curve, and as illustrated in FIG. 6C, the short sides of the frame 13b are bent to be a curve.

Alternatively, the frame 13b can be formed of a shape memory material, such as shape memory metal or alloy; or particularly, the frame 13b can include at least one hinge.

Alternatively, the controller 12 is particularly used for determining whether the electronic device activates a first type of application; in case that the electronic device activates the first type of application, the controller 12 determines the preset shape corresponding to the first type of application, wherein, in case that the electronic device activates the first type of application, it is indicated that the electronic device satisfies the preset condition. Particularly, the said first type of application can be a telephone application, an instant voice application, a voice recording application, a video player or an audio player, etc.

Alternatively, the surface 111 of the body 11 has a third side and a forth side facing with each other, such as the side 1112a and the side 1112b illustrated in FIG. 3B, and a voice output unit 15 is provided at a position close to the third side, i.e. the side 1112a, on the first surface 111, and a deformable display unit 14 is also provided on the surface 111; the controller 12 is particularly used for: determining whether the electronic device activates an audio application, wherein, the audio application can output an audio file through the voice output unit; and the controller 12 is also particularly used for: controlling a deformation of the frame 13b, as illustrated in FIG. 6B, reducing the distance between the third side and the forth side, i.e. the side 1112a and the side 1112b, to a preset scope to drive the body 11 to be deformed to a preset curve surface so that by looking from the view point of the display unit 14, the display unit 14 is recessed.

It should be noted that the above audio application, such as a telephone application, an instant voice application, a voice recording application, can output audio files through the voice output unit 15, and the present disclosure does not intend to make any limitation. The above preset scope is determined from an average value of the user's facial curve, which can be 10~13 cm, 13~15 cm, 15~20 cm, and the present disclosure does not intend to make any limitation.

Further, with reference to FIG. 7, the controller 12 is also used for: after the frame 13b is controlled to deform, detecting the distance between a block surface 20 and/or the third side and/or the forth side, wherein, the block surface 20 is at a side to which the display unit 14 faces; controlling the deformation of the frame 13b so that the distance is less than or equal to the distance threshold to drive the body 11 to be deformed to the first curve surface in case that the distance is larger than a distance threshold, wherein, the curvature of the first curve surface is larger than that of the preset curve surface.

It should be noted that the above preset curve surface and the first curve surface can be a curve surface with a uniform curvature, such as a circular arc surface, or can be a curve surface with a non-uniform curvature, such as a curve surface with an "L" shape, a "J" curve, and the present disclosure does not intend to make any limitation.

Alternatively, a deformable display unit 14 is provided on the first surface 111 of the body 11, and the first surface 111 at least comprises two long sides facing each other, and two short sides facing each other, and the short sides respectively connect to two ends of the long sides; the controller 12 is particularly used for: determining whether the electronic device activates a video player application; and also used for: controlling the two long sides to deform to drive the body 11 to be deformed to a second curve surface with a preset curvature, as illustrated in FIG. 8, so as to conform with the user's viewing field angle.

Alternatively, a deformable display unit 14 is provided on the first surface of the body 11; the controller 12 is particularly used for: determining whether the electronic device activates a music player application; and also used for: after the first control instruction is obtained, generating an instruction sequence based on the first control instruction; performing the instruction sequence, and controlling the frame 13b to deform between the second form and a forth form back and forth, wherein, the forth form is the same as or different from the first form.

Alternatively, the controller 12 is particularly used for: determining whether the manner of holding the electronic device is a first holding manner; determining a preset shape corresponding to the information of the first holding manner in case that the manner of holding the electronic device is the first holding manner; controlling the deformation of the frame 13b to drive the body 11 to be deformed to the preset shape so as to reduce the distance between the two opposite sides which are held by the user.

Specifically, the frame 13b also has the forth form which can be the same as the first form, and at this time, the frame 13b is controlled by the controller 12 and is in the above first form; the forth form can also be different from the first form, and at this time, the frame 13b can only be affected by gravity, and the present disclosure does not intend to make any limitation.

Various modifications and embodiments of the method for controlling the electronic device in the foregoing embodiments are also applicable to the electronic device of the present embodiment, and since those skilled in the art can clearly know the implementation of the electronic device in the present embodiment through the detailed description of foregoing method for controlling the electronic device, such detailed description will not be provided herein for the sake of simplicity.

One or more embodiments of the present disclosure can achieve the following technical effects:

Because a controller is provided in the body of the electronic device and a deformable structure, which is connected with the controller, is provided on the body, in case that the deformable structure is in the first form, it is determined whether the electronic device satisfies a preset condition. in case that the electronic device satisfies the preset condition, the first control instruction is obtained, the deformable structure is controlled to deform from the first form to the second form, and at least a part of the body is driven to be deformed, and before the second control instruction is received, the deformable structure is controlled to maintain in the second form, that is to say, in case that the deformable structure is in the first form, the controller can control the deformable structure to deform to the second form in the case that the electronic device satisfies the preset condition, and the deformable structure can maintain in the second form before a further control instruction is received. The deformation of the deformable structure can drive at least a part of body to be deformed, that is, the electronic device can deform on its own without any external force, and it effectively solves the conventionally technical problem that the electronic device cannot deform on its own, and achieves that the electronic device deforms on its own, and improves the intelligence of the electronic device, and provides a good user experience.

Those skilled in the art should appreciate that the embodiments in the present disclosure can be provided as a method, a system or a computer program product. Therefore, the present disclosure can employ the form of a full hardware embodiment, a full software embodiment, or an embodiment of combining software and hardware. Moreover, the present disclosure can employ the form of computer program products which are implemented on one or more computer available storage media (including, but not limited to, magnetic disk memory, CD-ROM, optical memory, etc) in which computer available program code is included.

The present disclosure is described with reference to the flowchart and/or block diagram of the method, the device (the system) and the computer program product according to the embodiments of the present disclosure. It should be appreciated that each process and/or block in the flowchart and/or the block diagram and the combination of the process and/or the block in the flowchart and/or the block diagram can be implemented by the computer program instructions. These computer program instructions can be provided into a processor in a general purpose computer, a special purpose computer, an embedded processor or other programmable data processing device to produce a machine, so as to produce a means for achieving a function specified by one or more processes in the flowchart and/or one or more blocks in the block diagram through the instructions executed by the processor in the computer or other programmable data processing device.

These computer program instructions may also be stored in a computer readable memory which can direct a computer or other programmable data processing device to function in a particular manner, so that the instructions stored in the computer readable memory produce a manufacture product including an instruction means which achieves a function specified by one or more processes in the flowchart and/or one or more blocks in the block diagram.

These computer program instructions may also be loaded onto a computer or other programmable data processing device, so that a series of operation steps are performed on the computer or other programmable data processing device to produce a process implemented by the computer, and thus, the instruction performed on the computer or other programmable data processing device provides steps for achieving a function specified by one or more processes in the flowchart and/or one or more blocks in the block diagram Although the preferred embodiments of the present disclosure have been described, once those skilled in the art know the basic inventive concepts, they can make other variations and modifications to these embodiments. Therefore, the appended claims are intended to be construed to include both the preferred embodiments and all variations and modifications that fall within the scope of the disclosure.

It is obvious that those skilled in the art can make various modifications and variations to the embodiments of the present disclosure without departing from the spirit and the scope of the embodiments of the present disclosure. Thus, if these modifications and variations of the embodiments of the present disclosure belong to the scope of the claims of the present disclosure and their equivalents, the present disclosure is intended to include these modifications and variations.

The invention claimed is:

1. A method for controlling an electronic device comprising:
   determining whether the electronic device satisfies a preset condition in case of a deformable structure in the electronic device being in a first form;
   obtaining a first control instruction,
   controlling the deformable structure to deform from the first form to a second form to drive at least a part of a body of the electronic device to be deformed in case of the electronic device satisfying the preset condition, and
   controlling the deformable structure to maintain in the second form before a second control instruction is received, wherein, the second control instruction controls the deformable structure to deform from the second form to a third form which is different from or the same as the first form,
   wherein, after controlling the deformable structure to deform, the method further comprises:
   detecting a distance between a block surface and a third side and/or a fourth side on a first surface of the body, wherein, the block surface is at a side to which the first surface faces; and
   controlling the deformable structure to deform in case of the distance being larger than a distance threshold, so that the distance is decreased to drive the body to be deformed to be a first curve surface, wherein, the curvature of the first curve surface is larger than that of a preset curve surface in the second form.

2. The method according to claim 1, wherein controlling the deformable structure to deform from the first form to a second form to drive at least a part of a body of the electronic device to be deformed comprises:

determining a preset shape corresponding to the preset condition; and controlling the deformable structure to move with respect to the body to drive a first side and a second side facing each other included in at least two sides of a deformable display unit provided on the first surface of the body to move with respect to the body, and deforming the deformable structure to the second form so as to deform the display unit to the preset shape, wherein the at least two sides of the display unit are moveably connected with the first surface through the deformable structure.

3. The method according to claim 1, wherein controlling the deformable structure to deform from the first form to a second form to drive at least a part of a body of the electronic device to be deformed comprises:

determining a preset shape corresponding to the preset condition; and controlling a frame provided at an edge of the body of the electronic device to deform to the second form to drive the body to be deformed to the preset shape.

4. The method according to claim 3, wherein, determining whether the electronic device satisfies a preset condition comprises determining whether the electronic device activates a first type of application, wherein, in case that the electronic device activates the first type of application, it is indicated that the electronic device satisfies the preset condition.

5. The method according to claim 4, wherein determining whether the electronic device activates a first type of application comprises determining whether the electronic device activates an audio application, wherein, the audio application is able to output an audio file through a voice output unit provided at a position close to the third side on the first surface of the body; and controlling the frame to deform to the second form to drive the body to be deformed to the preset shape comprises controlling the frame to deform and reducing a distance between the third side and the fourth side, which is on the first surface of the body, facing the third side to a preset scope to drive the body to be deformed to the preset curve surface so that by looking from a view point of a deformable display unit provided on the first surface, the display unit is recessed.

6. The method according to claim 5, wherein after the controlling the frame to deform, the method further comprises:

detecting the distance between the block surface and the third side and/or the fourth side, wherein, the block surface is at a side to which the display unit faces; and controlling the frame to deform in case of the distance being larger than a distance threshold, so that the distance is decreased to drive the body to be deformed to be the first curve surface, wherein, the curvature of the first curve surface is larger than that of the preset curve surface.

7. The method according to claim 4, wherein determining whether the electronic device activates a first type of application comprises determining whether the electronic device activates a video player application; and controlling the frame to deform to the second form to drive the body to be deformed to be the preset shape comprises controlling two long sides among two short sides and the two long sides at least included on the first surface of the body to deform to drive the body to be deformed to be a second curve surface with a preset curvature, so as to conform with the user's viewing field angle, wherein the two long sides are facing each other, and the two short sides are facing each other, and the two short sides are respectively connect with two ends of the long sides, and a deformable display unit is provided on the first surface of the body.

8. The method according to claim 4, further including a deformable display unit is provided on the first surface of the body, wherein determining whether the electronic device activates a first type of application comprises determining whether the electronic device activates a music player application; and after the first control instruction is obtained, also comprising generating an instruction sequence based on the first control instruction; performing the instruction sequence, and controlling the frame to deform between the second form and a fourth form back and forth, wherein, the fourth form is the same as or different from the first form.

9. The method according to claim 3, wherein the determining whether the electronic device satisfies a preset condition comprises:

determining whether the manner of holding the electronic device is a first holding manner; and controlling the deformable structure to deform from the first form to a second form to drive at least a part of a body of the electronic device to be deformed in case of the electronic device satisfying the preset condition comprises determining a preset shape corresponding to the information of the first holding manner in case of the manner of holding the electronic device being the first holding manner controlling the frame to deform, to drive the body to be deformed to the preset shape so as to reduce the distance between the two opposite sides which are held by the user.

10. An electronic device, comprising:

a body;

a controller, provided in the body;

a deformable structure, provided on the body and connected with the controller;

wherein, the controller determines whether the electronic device satisfies a preset condition in case that the deformable structure is in the first form; obtains a first control instruction, and controls the deformable structure to deform from the first form to a second form to drive at least a part of the body to be deformed in case that the electronic device satisfies the preset condition, and before a second control instruction is received, controls the deformable structure to maintain in the second form, wherein, the second control instruction is used for controlling the deformable structure to deform from the second form to a third form which is the same as or different from the first form, wherein, after controlling the deformable structure to deform, the controller further detects a distance between a block surface and a third side and/or a fourth side on a first surface of the body, wherein, the block surface is at a side to which the first surface faces; and controls the deformable structure to deform in case of the distance being larger than a distance threshold, so that the distance is decreased to drive the body to be deformed to be a first curve surface, wherein, the curvature of the first curve surface is larger than that of a preset curve surface in the second form.

11. The electronic device according to claim 10, wherein a deformable display unit is provided on the first surface of the body, and at least two sides of the display unit are movably connected with the first surface through the deformable structure, the at least two sides comprise a first side and a second side facing with each other; and the controller determines a preset shape corresponding to the preset condition; controls the deformable structure to move with respect to the body, to drive the first side and the second side to be moved with respect to the body, and deforms the deformable structure to the second form so as to deform the display unit to the preset shape.

12. The electronic device according to claim 10, wherein the deformable structure is a frame of the electronic device, which is provided at an edge of the body; and the controller determines a preset shape corresponding to the preset condition; controlling the frame to deform to the second form to drive the body to be deformed to the preset shape.

13. The electronic device according to claim 12, wherein the controller determines whether the electronic device activates a first type of application; determines the preset shape corresponding to the first type of application in case that the electronic device activates the first type of application, wherein, in case that the electronic device activates the first type of application, it is indicated that the electronic device satisfies the preset condition.

14. The electronic device according to claim 13, wherein the first surface of the body has the third side and the fourth side facing with each other, and a voice output unit is provided at a position, which is close to the third side, on the first surface, and a deformable display unit is also provided on the first surface; and the controller determines whether the electronic device activates an audio application, wherein, the audio application is able to output an audio file through the voice output unit; and controls the frame deform to reduce the distance between the third side and the fourth side to a preset scope and to drive the body to be deformed to the preset curve surface so that by looking from the view point of the display unit, the display unit is recessed.

15. The electronic device according to claim 14, wherein after the controlling the frame to deform, the controller detects the distance between the block surface and the third side and/or the fourth side, wherein, the block surface is at a side to which the display unit faces; controls the frame to deform so that the distance is decreased to drive the body to be deformed to be the first curve surface in case that the distance is larger than a distance threshold, wherein, the curvature of the first curve surface is larger than that of the preset curve surface.

16. The electronic device according to claim 13, wherein a deformable display unit is provided on the first surface of the body, and the first surface at least comprises two long sides facing each other, and two short sides facing each other, and the short sides respectively connect with two ends of the long sides; and the controller determines whether the electronic device activates a video player application; and controls the two long sides to deform to drive the body to be deformed to be a second curve surface with a preset curvature, so as to conform with the user's viewing field angle.

17. The electronic device according to claim 13, wherein a deformable display unit is provided on the first surface of the body; and the controller determines whether the electronic device activates a music player application; after the first control instruction is obtained, generates an instruction sequence based on the first control instruction; performs the instruction sequence, and controls the frame to deform between the second form and a fourth form back and forth, wherein, the fourth form is the same as or different from the first form.

18. The electronic device according to claim 12, wherein the controller determines whether the manner of holding the electronic device is a first holding manner; determines a preset shape corresponding to the information of the first holding manner in case that the manner of holding the electronic device is the first holding manner; controls the frame to deform to drive the body to be deformed to the preset shape so as to reduce the distance between the two opposite sides which are held by the user.

19. The electronic device according to claim 12, wherein the frame is formed of a shape memory material; or the frame includes at least one hinge.

* * * * *